United States Patent [19]

Zimmer

[11] 4,248,337
[45] Feb. 3, 1981

[54] EQUIPMENT FOR HANDLING BULK MATERIAL

[75] Inventor: Karl E. Zimmer, Eiweiler, Fed. Rep. of Germany

[73] Assignee: Pohlig-Heckel-Bleichert Vereinigte Maschinenfabriken, Fed. Rep. of Germany

[21] Appl. No.: 967,405

[22] Filed: Dec. 7, 1978

[30] Foreign Application Priority Data

Dec. 17, 1977 [DE] Fed. Rep. of Germany ....... 2756312

[51] Int. Cl.$^3$ ............................................. B65G 65/06
[52] U.S. Cl. ................................... 198/301; 198/505;
 198/507; 198/520; 198/836
[58] Field of Search ............... 198/301, 505, 510, 519,
 198/520, 836, 507; 414/133

[56] References Cited

U.S. PATENT DOCUMENTS

| | | | |
|---|---|---|---|
| 2,637,434 | 5/1953 | Harper | 198/505 |
| 3,108,700 | 10/1963 | Swindells et al. | 198/519 X |
| 3,139,217 | 6/1964 | Mell | 198/505 X |
| 4,120,408 | 10/1978 | Gehring et al. | 198/520 X |

FOREIGN PATENT DOCUMENTS

| | | | |
|---|---|---|---|
| 1032170 | 6/1958 | Fed. Rep. of Germany | 414/133 |
| 2419788 | 11/1975 | Fed. Rep. of Germany | 198/519 |
| 2616807 | 10/1977 | Fed. Rep. of Germany | 198/520 |
| 2020147 | 7/1970 | France | 198/505 |
| 1098176 | 1/1968 | United Kingdom | 198/505 |

*Primary Examiner*—James L. Rowland

[57] ABSTRACT

An endless scraper chain carried by a bridge is provided with spaced scraper flights. The scraper chain is driven so as to move its lower course toward one end to thereby move bulk material to a roller bed extending under that one end. The roller bed is connected to the bridge to move therewith. An endless conveyor belt is supported on the roller bed and extends transversely of the bridge and has an upper course which extends under the one end of the scraper chain to receive the bulk material from the scraper chain. A conveyor type weigher is adapted to indicate the weight of bulk material lying on the upper course of the conveyor belt in a predetermined area thereof. Mutually opposite confining walls are disposed on opposite sides of said lower course of said scraper chain, and are mounted to the bridge to permit vertical movement of said confining walls.

9 Claims, 5 Drawing Figures

U.S. Patent  Feb. 3, 1981  Sheet 1 of 3  4,248,337
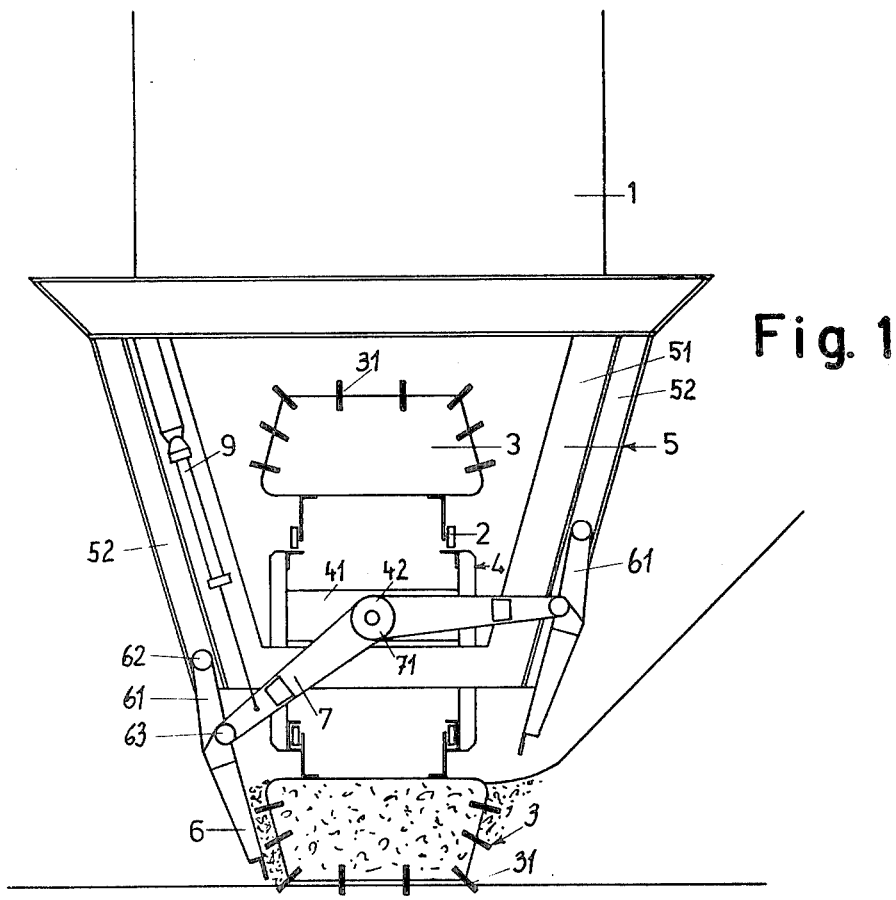
Fig. 1
Fig. 5
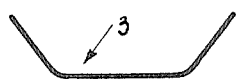

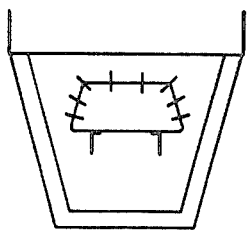
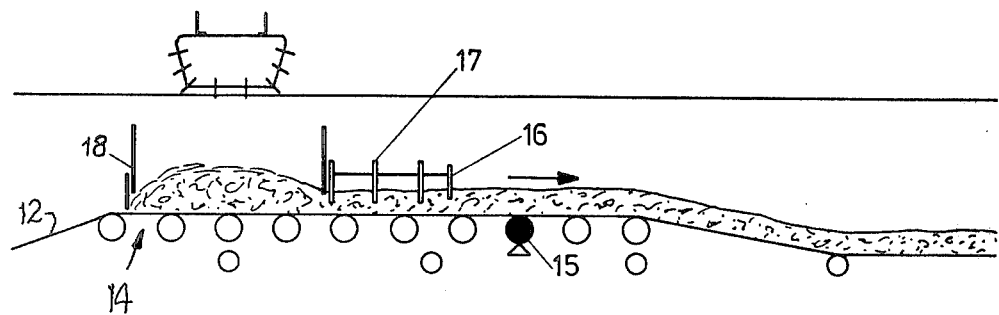
Fig. 3
Fig. 4
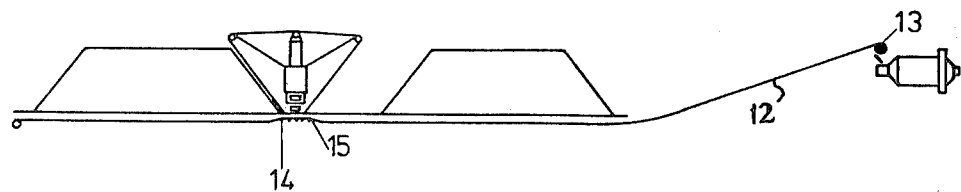

EQUIPMENT FOR HANDLING BULK MATERIAL

BACKGROUND OF THE INVENTION

This invention relates to equipment for taking bulk material from a dump and for conveying the bulk material to a processing plant of the type which includes a bridge which extends along one end face of the dump and is movable along the dump transversely of the end face, an endless scraper chain which is carried by said bridge and provided with scraper flights and revolves in a vertical plane parallel to the end face of the dump, a roller bed disposed below the delivery end of the scraper chain and connected to the bridge to move therewith, a conveyor belt which overlies the roller bed, and a conveyor type weigher incorporated in said roller bed.

Such equipment as well as equipment in which the scraper chain revolves in a horizontal plane are known from German Patent Specification No. 1,032,170 and Published German Specification No. 2,616,807. The rate at which bulk material can be taken by such equipment is virtually constant. This is not objectionable when merely a rearrangement of bulk material is desired, as is necessary with some materials, e.g., in order to prevent an undesired heating or caking. On the other hand, the bulk material taken from the dump is often supplied by the conveyor belt to a processing station, in which the bulk material is processed, e.g., by being reduced in size, ground or sorted and from which the resulting product is then removed. Processing stations may also consist of loading stations in which the bulk material is loaded on transportation equipment, such as railroad cars, motor vehicles or the like. The rate at which material is to be removed from the processing station will depend on the demand and on the number and capacity of the transportation vehicles which are available at a given time. For instance, installations used in the cement industry are provided with bins for intermediate storage or with feeding bins for receiving surplus material removed from the dump, and with means for removing material from such bins at the rate which is required for supply to grinding mills, sorting means or the like so that the latter deliver processed material at the desired rate (see periodical "Zement, Kalk, Gips", 1976, No. 11, pages 491, 496). Obviously such measures involve a considerable expenditure in equipment and it is impossible or difficult to incorporate such equipment in existing processing plants, e.g., because of a lack of space or because of excessive costs.

It is an object of the invention to eliminate these disadvantages and to provide equipment which eliminates the need for intermediate storage bins at the processing station and for means for supplying and removing material to and from such bins.

BRIEF DESCRIPTION OF THE DRAWINGS

An illustrative embodiment of the invention will now be described more fully with reference to the accompanying diagrammatic drawings, in which FIG. 1 is a transverse sectional view of the conveyor chain of the present invention.

FIG. 3 is a sectional view showing the roller bed in conjunction with the conveyor chain of FIG. 1.

FIG. 4 is a diagrammatic illustration of the weigher for controlling the drive of the conveyor chain, and FIG. 5 is a transverse sectional view showing scraper flights utilized on the conveyor chain of FIG. 1.

DESCRIPTION OF THE PREFERRED EMBODIMENTS

Figure 2:
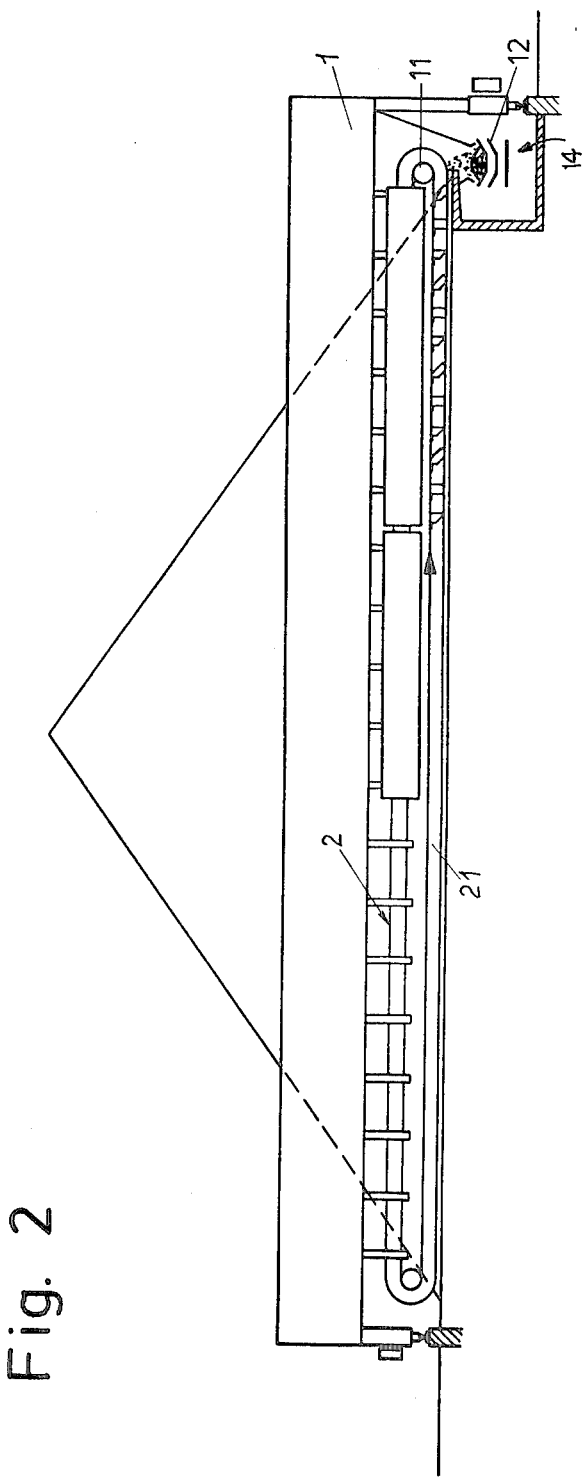
FIG. 2 is a side elevational view of the apparatus of FIG. 1.

The equipment shown on the drawing comprises a bridge 1, which is positionable so as to be parallel to the base of the dump with both ends protruding laterally beyond the dump. The bridge is provided with respective running gears, which support the bridge on two single- or double-rail tracks, which are disposed on opposite sides of the dump and extend along the same transversely to the bridge. By means of these running gears the bridge is movable along the dump. A scraper conveyor which comprises a scraper chain 2 having scraper flights 3 connected thereto, is mounted on the bridge. The chain 2 is adapted to be driven so as to revolve in a substantially vertical plane which is at right angles to the base of the dump. Lateral confining walls 6 are provided on both sides of the lower course of the scraper chain and are movable together with the bridge or with a frame 5, which protrudes downwardly from the bridge. The confining walls 6 are adapted to be lowered and lifted relative to the base of the dump by actuating means 9.

In the preferred embodiment which is best apparent from FIG. 1, arms 61 protrude upwardly from the top longitudinal edges of the confining walls 6, and guide pins or guide rollers 62 are mounted on said arms at the free upper ends thereof. Frames 51 depend from the bridge 1 and carry guides 52, which confine the guide pins or guide rollers 62. A carrying frame 4 for the scraper chain 2 is supported by said frames 51 and comprises cross-beams 41. A horizontal pivot pin 42 protrudes from each cross-beam 41. The arms 61 are provided near their lower ends with horizontal pivot pins 63, which are rotatably mounted in respective ends of equal-length arms of a bell crank lever 7. The bell crank lever 7 has a bushing 71 at its vertex and is thereby rotatably mounted on the pivot pin 42. The bell crank lever is pivotally movable by actuating means consisting desirably of a hydraulic actuator 9, which is mounted on the bridge 2 and connected to one arm of the lever 7. By means of the bell crank lever, the confining walls disposed on both sides of the scraper flights of the lower course of the scraper chain are coupled to move in mutually opposite directions, i.e., as one wall is lifted or lowered, the other is lowered or lifted.

The scraper flights 3 are desirably provided along their side edges and their bottom edge with teeth 31 for loosening bulk material in the dump which cannot easily flow, e.g., because it is sticky. In cross-section the scraper flights preferably have the scooplike shape which is shown in FIG. 5. In that case they comprise a relatively wide, flat central portion and side walls which protrude from opposite sides of the central portion and define therewith an angle of about 120°. The width of each of said side walls is approximately one-half the width of the central portion. Such flights are relatively high and narrow and ensure that the spaces between adjacent flights will be filled with material to a fairly high, uniform degree.

A roller bed 14 and a conveyor belt 12 extend below the lower course of the scraper chain at the delivery end thereof. The roller bed 14 is movable along the dump transversely of bridge 1 and is connected, e.g., to the bridge 1 to move therewith. By means of the conveyor belt 12, which extends along the dump, bulk material which has been taken from the dump by the scraper conveyor is carried away from the dump. The scraper conveyor delivers bulk material onto the upper course of the conveyor belt, which is thus loaded with the weight of the bulk material. One roller 15 or a plurality of interconnected rollers of the roller bed protrudes above the plane defined by the remaining rollers of the roller bed and is or are mounted to be movable against an upwardly directed force, e.g., of spring means. The movable roller 15 of the conveyor type weigher will be displaced by the loaded conveyor belt in dependence on the weight of the bulk material on the conveyor belt, and an indication and/or an output signal corresponding to the weight can be derived from such displacement of the movable roller 15.

The scraper chain 2 is adapted to be driven by drive means 11, which are mounted on the bridge 1 preferably near the delivery end of the scraper conveyor. The conveyor belt is adapted to be driven by drive means indicated at 13 in FIG. 4. In many cases, the bulk material taken from the dump is delivered by the conveyor belt 12 to a processing plant, e.g., a disintegrating device or mill. Such plants are often fed with material at varying rates, which depend on the characteristics of the plant or its operation. For this reason, when bulk material taken from the dump at a uniform rate such material must be supplied at least in part to storage means. Such storage means will not be required, however, if the rate at which material is taken from the dump is so controlled that said rate does not exceed the rate at which the material is required by the processing plant.

For this purpose, the drive means 11 and 13 for the scraper conveyor 2 and the conveyor belt 12, respectively, are jointly controlled in dependence on the output signal of the conveyor type weigher so that the scraper conveyor and the conveyor belt operate at such speeds that they handle bulk material at a desired rate. The conveyor type weigher is preceded by a leveler 17, which is disposed above the roller bed 14 and comprises a number of spikes, arranged in one row or in a plurality of rows, and side walls 16, which are disposed adjacent to and laterally inwardly of the edges of the conveyor belt. The spikes penetrate into the bulk material lying on the conveyor belt and spread said bulk material to form a bed which has a substantially uniform thickness and a width defined by the spacing of the side walls. The side walls are sufficiently spaced inwardly from the edges of the upper course of the conveyor belt to prevent the bulk material from overflowing the conveyor belt when it has left the space which is laterally defined by said walls. At the delivery end of the scraper conveyor, a hopper 18 is disposed above the roller bed. By said hopper 18, the bulk material delivered by the scraper conveyor is received and delivered downwardly onto the conveyor belt 12. The hopper serves as a buffer and ensures a uniform loading of the conveyor belt even during slight fluctuations of the rate at which bulk material is delivered by the scraper conveyor.

If the conveyor belt is loaded with a predetermined quantity of bulk material per unit of area, the time average of the rate at which bulk material is handled by the conveyor belt can be computed from the output signal of the conveyor type weigher and from the speed of the conveyor belt. That time average depending on the speed of the conveyor belt can then be utilized for the control of the drive means 13 for the conveyor belt and of the drive means 11 for the scraper conveyor to ensure that bulk material is supplied to the receiving plant by the conveyor belt 12 at the desired rate. As a result, the receiving plant requires no storage means, which would occupy space and requires no means for conveying the bulk material from storage to the disintegrating machines or the like in said plant.

It will be seen that in accordance with the invention, the confining walls for the scraper chain are adapted to be adjusted relative to the base of the dump by actuating means disposed on both sides of the lower course of the scraper chain and connected to the bridge. The roller bed is provided with a leveler, which comprises lateral guide walls and precedes the conveyor type weigher, and controllable drive means are provided for the scraper conveyor and the conveyor belt.

It will also be seen that according to the invention, only that section of the confining walls which is remote from the end face of the dump is lowered to the level of the base of the dump, the confining walls thus ensure that virtually all bulk material which has been taken from the dump is delivered to the conveyor belt. The bulk material which has been received by the conveyor belt is weighed by the conveyor type weigher, which is traversed by bulk material in a stream which is laterally confined by the guide walls so that its cross-section is virtually constant. As a result, the weight indicated by the conveyor type weigher is substantially independent of random irregularities and is representative of the rtae at which bulk material is being handled. For this reason an operator who watches the weigher can control the drive means for the scraper conveyor and for the belt conveyor so that an accumulation of material between the scraper conveyor and the conveyor belt is precluded regardless of the rate at which bulk material is taken from the dump. Besides, bulk material can be taken from the dump at a rate which can be controlled to correspond to the rate at which bulk material is to be fed to the processing station. The conveyor belt which extends to the processing or loading equipment in a processing station may be designed or used for intermediate storage. In numerous cases, it is desirable that the rate at which bulk material is supplied to such disintegrating, sorting or loading equipment can be changed quickly and for short periods of time, e.g., when trouble which can be corrected within a short time occurs during operation. Because the drive means for the conveyor belt are controllable, the speed of the conveyor belt can be decreased and the conveyor belt can be charged to a greater height in such instances so that the conveyor belt then takes up the surplus bulk material for a certain period of time and thus provides for an intermediate storage of the material without the need for changing the setting of the drive means for the heavy scraper conveyor. For such a contingency, it may be desirable to design the belt conveyor for a higher carrying capacity than would otherwise be required. The drive means for the scraper conveyor and for the conveyor belt can easily be controlled in dependence on the weight indicated by the conveyor type weigher so that bulk material is taken from the dump at a predetermined rate and is delivered at the same rate by the conveyor belt. The drive means for the scraper conveyor and for the conveyor belt can be so designed that such control is automatically affected. An output signal may be derived from the weight indication of the conveyor tape weigher and may be used as such or converted into a signal for controlling the drive means. In a preferred embodiment as previously described, the confining walls disposed on both sides of the scraper chain are substantially vertically guided by guide pins or the like, which engage guides secured to the bridge, mutually opposite confining walls being pivoted to opposite ends of the equal-length arms of a bell crank lever by pivot pins disposed between such guide pins and the lower edges of the confining walls. The bell crank lever is pivoted at its vertex to the bridge on an axis which is parallel to the longitudinal direction of the bridge, and said bell crank lever is pivotally movable by actuating means consisting preferably of a hydraulic actuator and engaging one of the arms of the bell crank lever. In such an arrangement the two confining walls are coupled in a simple manner to move in mutually opposite directions. The leveler may be vertically adjustable. This will be advisable when the equipment is to be capable of effecting great changes in the rate at which the bulk material is to be handled. A handling of bulk material by the scraper conveyor at a fairly uniform rate is desirable. This means that the spaces between the scraper flights should be filled uniformly and completely, which will be ensured if the scraper flights are relatively high and narrow.

What is claimed is:

1. Apparatus for handling bulk material at controlled rates, comprising a bridge which extends in a first horizontal direction and is movable in a second substantially perpendicular horizontal direction; a scraper conveyor carried by said bridge and including an endless scraper chain having an upper and lower course and a series of scraper flights connected thereto in spaced relationship along the length thereof, first drive means adapted to drive said scraper conveyor toward one end at a selected rate of speed, said scraper conveyor being operable to move bulk material towards said one end thereof by means of said scraper flights; mutually opposite confining wall elements disposed on opposite sides of said lower course of said scraper chain, mounting means connecting said confining walls to said bridge and permitting guided vertical movement of said confining walls relative to said bridge, and actuating means operable to lift and lower said confining walls a roller bed extending under said one end of said scraper conveyor substantially perpendicularly thereof and connected to said bridge to move therewith; an endless conveyor belt supported by and overlying said roller bed having an upper course which extends under said one end of said scraper conveyor and adapted to receive bulk material which has been delivered by said scraper conveyor at said one end thereof; a conveyor-type weigher adapted to indicate the weight of bulk material lying on said upper course of said conveyor belt in a predetermined area thereof, said weigher being spaced in said second direction from said one end of said scraper conveyor; second drive means operably connected to said conveyor and belt adapted to drive said upper course thereof in said second direction from said one end of said scraper conveyor toward and beyond said predetermined area at a selected rate of speed.

2. Apparatus according to claim 1, including leveling means comprising a series of spike elements mounted above said conveyor belt and lateral guide walls along the sides of said conveyor belt, said spike element extending into engagement with the bulk material on said conveyor belt adapted to level bulk material on said upper course of said conveyor belt before said bulk material is carried to said predetermined area.

3. Apparatus according to claim 1, wherein said conveyor type weigher is incorporated in said roller bed.

4. Apparatus according to claim 1, wherein said first and second drive means are selectively operable to cause bulk material to be delivered by said conveyor belt at a predetermined rate.

5. Apparatus according to claim 1, wherein said conveyor-type weigher is adapted to produce an output signal indicative of the weight of bulk material lying on said upper course of said conveyor belt in said predetermined area thereof, and said first and second controllable drive means are adapted to control said scraper conveyor and said conveyor belt, respectively, in response to said output signal so that both deliver bulk material at the same predetermined rate of speed.

6. Apparatus according to claim 1, wherein said mounting means includes substantially vertical guides secured to said bridge and depending on opposite sides of said scraper conveyor, guide arms projecting upwardly from the respective top portions of said confining wall elements, guide elements mounted on said guide arms movable within said vertical guides, a bellcrank lever having arms of equal length carried pivotably by said bridge for pivotal movement about an axis parallel to said first direction, said arms of said bellcrank each having a free end, pivot means, pivotally connected, the lower end of each of said guide arms with the free end of one of said bellcrank arms, and said actuating means being operably connected to one of said bellcrank arms so as to impart pivotal movement to said bellcrank lever and thereby to said confining wall elements.

7. Apparatus according to claim 6, wherein said actuating means comprise a hydraulic actuator.

8. Apparatus according to claim 2, wherein said levelling means is vertically adjustable.

9. Apparatus according to claim 1, wherein said scraper flights are relatively high and narrow to facilitate the filling of the spaces between said flights with bulk material.

* * * * *